United States Patent [19]
Sakai et al.

[11] Patent Number: 5,969,624
[45] Date of Patent: Oct. 19, 1999

[54] BATTERY CHARGE CONTROL SYSTEM FOR A HYBRID VEHICLE DRIVEN BY AN ELECTRIC MOTOR AND AN INTERNAL COMBUSTION ENGINE

[75] Inventors: Shoji Sakai, Toyota; Hironori Asa, Okazaki; Sadahisa Onimaru, Chiryu; Mitsuo Inagaki, Okazaki, all of Japan

[73] Assignee: Nippon Soken, Inc,, Nishio, Japan

[21] Appl. No.: 08/628,185

[22] Filed: Apr. 5, 1996

[30] Foreign Application Priority Data

Apr. 7, 1995 [JP] Japan ................................ 7-107932
Nov. 29, 1995 [JP] Japan ................................ 7-335917

[51] Int. Cl.[6] .................................................. G08B 91/00
[52] U.S. Cl. .......................... 340/636; 340/648; 180/65.2; 307/9.1; 307/10.7; 307/17; 307/18; 307/102; 307/122
[58] Field of Search ........................... 340/636; 307/10.7, 307/9.1, 10.6, 11; 180/65.2, 65.6, 65.4; 320/61, 65, 152, 155, 20, 18, 17, 22, 39, 119, 120, 102, 103, 106, 124, 122

[56] References Cited

U.S. PATENT DOCUMENTS

| | | | |
|---|---|---|---|
| 3,842,287 | 10/1974 | Nakamura | 290/16 |
| 4,238,721 | 12/1980 | DeLuca et al. | 320/18 |
| 4,313,080 | 1/1982 | Park | 320/61 |
| 4,923,025 | 5/1990 | Ellers | 180/65.2 |
| 5,055,763 | 10/1991 | Johnson et al. | 320/15 |
| 5,264,764 | 11/1993 | Kuang | 318/139 |
| 5,343,970 | 9/1994 | Severinsky | 180/65.2 |
| 5,659,240 | 8/1997 | King | 320/30 |

FOREIGN PATENT DOCUMENTS

| | | |
|---|---|---|
| 5-153703 | 6/1993 | Japan . |
| 5-219608 | 8/1993 | Japan . |
| 6-075027 | 3/1994 | Japan . |
| 6-295746 | 10/1994 | Japan . |

*Primary Examiner*—Edward Lefkowitz
*Assistant Examiner*—Davetta Woods
*Attorney, Agent, or Firm*—Pillsbury Madison & Sutro

[57] ABSTRACT

A hybrid vehicle comprises a motor driving the vehicle's wheels, multiple batteries supplying electric power to the motor, and a generator driven by an internal combustion engine to generate electric power for charging the batteries. Battery sensors detect terminal voltages of the batteries. An ECU controls a DC/DC converter to distribute electric power to independently charge the batteries through charge lines in accordance with the shortage of charge in respective batteries when excess electrical power is available from the generator even after a required amount of electrical power from the generator is used to rotate wheels.

39 Claims, 7 Drawing Sheets

BATTERY CHARGE CONTROL SYSTEM FOR A HYBRID VEHICLE DRIVEN BY AN ELECTRIC MOTOR AND AN INTERNAL COMBUSTION ENGINE

BACKGROUND OF THE INVENTION

1. Field of the Invention

This invention relates to a hybrid vehicle driven by a combination of two driving sources, such as an electric motor using electric power and an internal combustion engine using fuel such as gasoline or light oil, and more particularly to a battery charge control system for a hybrid vehicle capable of finely controlling the state-of-charge of each of numerous batteries installed on the vehicle.

2. Related Art

Motor-driven electric cars, when compared with normal engine-driven vehicles, are generally advantageous in their cleanness represented by no exhaust gas emission, i.e., no air pollution, noiselessness, and excellent drivability represented by quick response during the acceleration and the deceleration.

On the other hand, electric cars have poor cruising distances due to poor electric power capacity available from present-day batteries, and are suffering from expensive energy cost per travelling distance.

To eliminate such weakness of electric cars and enhance their advantages, there have been recently proposed various types of hybrid vehicles comprising a combination of an electric motor using electric power supplied from batteries and an internal combustion engine using fuel such as gasoline or light oil.

Among them, the hybrid vehicles are roughly divided into two types. One type is a series hybrid vehicle (SHV) which uses an electric motor as a single driving source for exclusively driving the wheels of the vehicle and uses an internal combustion engine as a source for solely rotating a generator for charging the batteries.

The other type is a parallel hybrid vehicle (PHV) which selectively or alternately, otherwise simultaneously uses an electric motor and an internal combustion engine as a driving source for driving the wheels of the vehicle in accordance with travelling conditions of the vehicle, and rotates a generator for charging the batteries.

A problem of such hybrid vehicles is that continuing charging operation against a fully charged battery may unexpectedly lower the charging efficiency of the battery as well as deteriorate the durability of the battery.

To solve this problem, Unexamined Japanese Patent Application No. HEI 5-153703, published in 1993, discloses a battery charge control system which forcibly disconnects a battery from a generator to stop the charging operation when its state-of-charge value is sufficiently large.

To obtain electric power sufficient to drive an electric motor, a number of batteries are connected in series. The fact is that the state-of-charge is not the same in each of these serially connected batteries even though these batteries are operated under the same conditions.

It is usual that charging of these plural batteries is performed by detecting a single, representative state-of-charge value and charging each battery uniformly based on the detected representative state-of-charge. Namely, the generator starts charging all the batteries by the same amount regardless of actual state-of-charge of each battery.

Accordingly, for some of batteries, such a uniform charging operation by the generator will possibly cause an excessive charge. On the contrary, for some of other batteries, this uniform charging operation may cause an excessive discharge if their state-of-charge is not sufficiently high even after the charging operation is finished.

Unexamined Japanese Patent Application No. HEI 5-219608, published in 1993, discloses a monitor system providing a plurality of sensors for detecting each state-of-charge of every single battery and displaying all of state-of-charge values of individual batteries simultaneously.

Furthermore, Unexamined Japanese Patent Application No. HEI 6-75027, published in 1994, discloses another monitor system calculating an average voltage of all batteries and making a judgement that the life is over when the number of batteries having a voltage lower than the average voltage reaches a predetermined number.

SUMMARY OF THE INVENTION

Accordingly, in view of above-described problems encountered in the related art, a principal object of the present invention is to provide a battery charge control system applicable to a hybrid vehicle carrying plural batteries for controlling the state-of-charge of individual batteries precisely.

In order to accomplish this and other related objects, a first aspect of the present invention provides a novel and excellent battery charge apparatus for a hybrid vehicle, comprising an electric drive means, plural batteries, a generator means, a state-of-charge detecting means, and a charge control means. More specifically, the electric drive means rotates wheels of the hybrid vehicle. Plural batteries supply electric power to the electric drive means. The generator means is driven by an internal combustion engine for generating electric power to charge the plural batteries. The state-of-charge detecting means detects the state-of-charge of each of plural batteries. And, the charge control means independently charges each of the plural batteries based on the state-of-charge detected by the state-of-charge detecting means, thereby independently charging each battery in accordance with an actual state-of-charge of each battery.

According to the features of preferred embodiments of the present invention, it is desirable that the hybrid vehicle is a series hybrid vehicle having wheels solely driven by kinetic energy obtained from the electric drive means, or a parallel hybrid vehicle having wheels driven by kinetic energy obtained from both the electric drive means and the internal combustion engine. The charge control means distributes electric power in accordance with the actual state-of-charge of respective batteries when the electric power is available as a remainder from the generator means even after a required amount of electric power is used from the generator means to rotate the wheels. The state-of-charge detecting means detects the state-of-charge by sensing an actual terminal voltage of each of the plural batteries. The state-of-charge detecting means obtains an average of the state-of-charge among the plural batteries as a reference value, and the charge control means charges a concerned battery only when the concerned battery has a state-of-charge lower than the reference value. The charge control means distributes electric power in accordance with the shortage of charge in respective batteries when the electric power is available as a remainder from the generator means even after a required amount of electric power is used from the generator to rotate the wheels. The state-of-charge detecting means detects an actual terminal voltage of each battery, and calculates an average of the actual terminal voltage among the plural batteries as the reference value. The plural batteries are connected in series, and each battery is independently connected to the charge control means through exclusive charge lines. Furthermore, a switching means may be interposed in a path connecting the generator means and the batteries for switching a first charge circuit and a second charge circuit. The first charge circuit connects the generator means to the batteries through the charge control means, while the second charge circuit connects the generator means to the batteries directly. And, the switching means selects the second circuit when the plural batteries have no substantial deviation in their state-of-charge values.

Furthermore, a second aspect of the present invention provides a novel and excellent battery charge apparatus for a hybrid vehicle, comprising an electric drive means, plural batteries, a generator means, a state-of-charge detecting means, a charge control means, and a distribution ratio change means. More specifically, the electric drive means rotates the wheels of the hybrid vehicle. The plural batteries supply electric power to the electric drive means. The generator means is driven by an internal combustion engine for generating electric power to charge the plural batteries. The state-of-charge detecting means detects the state-of-charge of each of the plural batteries. The charge control means independently charges each of the plural batteries based on the state-of-charge detected by the state-of-charge detecting means. And, the distribution ratio change means changes a distribution ratio according to which electric power is supplied from the generator means to respective batteries.

In this case, it is preferable that the distribution ratio change means changes the distribution ratio so as to eliminate the dispersion of state-of-charge among the plural batteries. The distribution ratio change means changes the distribution ratio only when the dispersion of state-of-charge exceeds a predetermined allowable limit.

Moreover, a third aspect of the present invention provides a battery charge method for a hybrid vehicle having a plurality of batteries, comprising steps of: detecting the state-of-charge value of each of the plural batteries; judging whether a dispersion of state-of-charge value of the plural batteries is within a predetermined allowable zone; and determining a distribution ratio according to which electric power is supplied from a generator to respective batteries for charging the batteries independently. The distribution ratio is set in such a manner that all of the plural batteries are uniformly charged when the dispersion of state-of-charge value is within the predetermined allowable zone, while some of batteries are chiefly charged when the dispersion of state-of-charge value is out of the predetermined allowable zone, thereby eliminating the dispersion of state-of-charge value.

According to the features of preferred embodiments, it is desirable that the state-of-charge value is detected by sensing a momentary terminal voltage of each battery and obtaining an average of sensed momentary terminal voltages. The dispersion of state-of-charge value is defined as a deviation of each state-of-charge value from a reference value. The reference value is an average of all of state-of-charge values. There is further provided a step of charging the batteries in accordance with the distribution ratio when electric power is available as a remainder from the generator means even after a required amount of electric power is used from the generator to rotate wheels of the hybrid vehicle.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Preferred embodiments of the present invention will be explained in greater detail hereinafter, with reference to the accompanying drawings. Identical parts are denoted by the same reference numeral throughout views.

Figure 1:
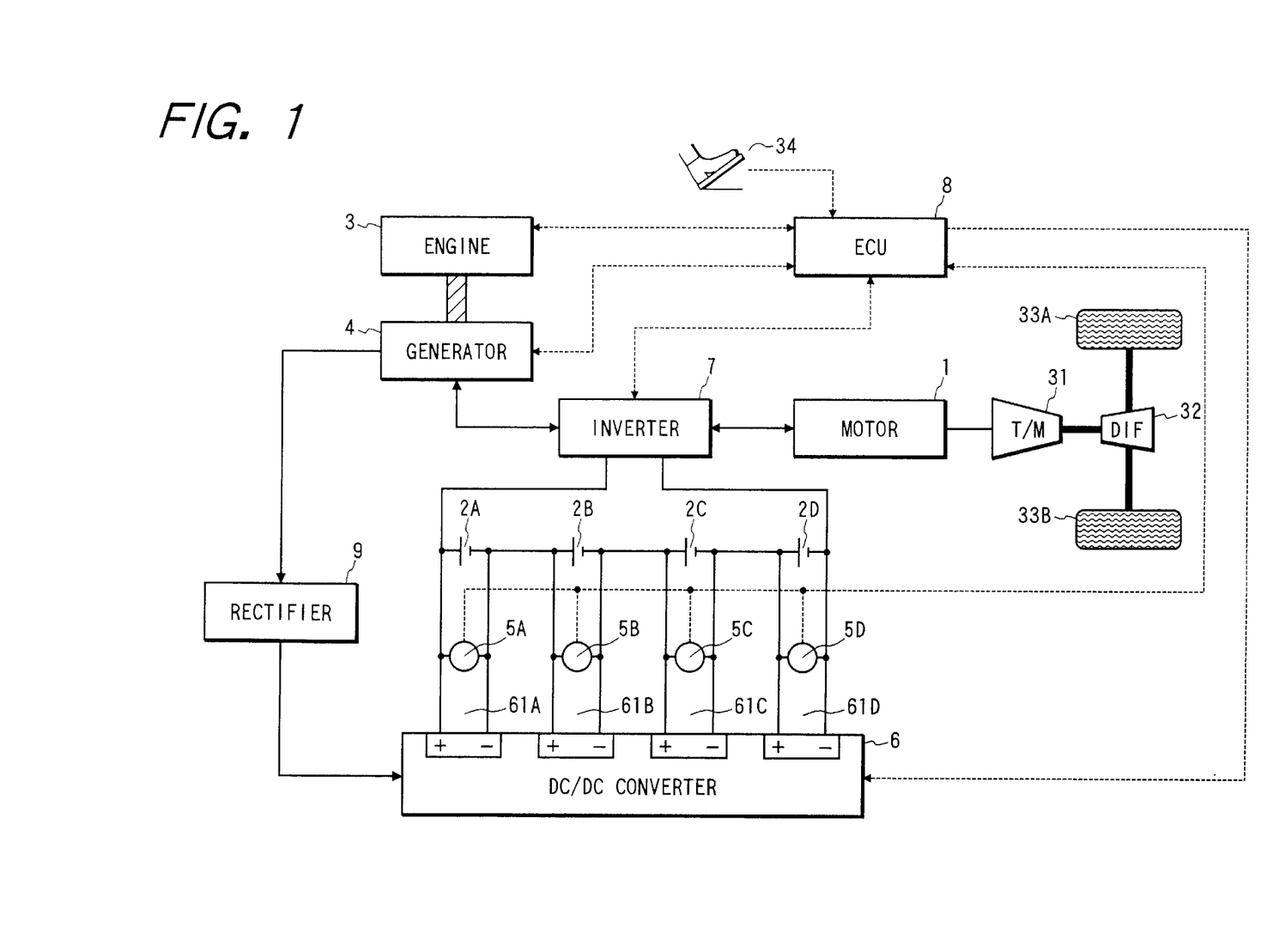
FIG. 1 is a block diagram showing an overall arrangement of a battery charge system for a hybrid vehicle in accordance with a first embodiment of the present invention.

FIG. 1 is an overall arrangement of a battery charge control system incorporated in a series hybrid vehicle (SHV) in accordance with a first embodiment of the present invention. A hybrid vehicle generally comprises, as a driving source of the vehicle, an electric motor 1 whose capacity or total number is determined in accordance with the specifications of each vehicle. However, for the purpose of simplifying the explanation, only one electric motor 1 is shown in the drawing.

The electric motor 1, which is either a DC motor or an AC motor, has an output shaft connected in a driving linkage relation to vehicle wheels 33A and 33B through a conventional driving mechanism including a transmission 31 and a differential mechanism 32. Thus, wheels 33A and 33B are driven or rotated by the kinetic energy obtained from electric motor 1.

In this embodiment, electric motor 1 is an AC motor electrically driven by AC current supplied from an inverter 7 which is connected to a plurality of batteries 2A, 2B, 2C and 2D. The inverter 7 is operated by an electronic control unit (ECU) 8. The batteries 2A to 2D are connected in series to supply electric power to electric motor 1 through inverter 7. Inverter 7 converts the electric power from DC to AC through its built-in rectifying circuit (not shown) and supplies AC power to motor 1, so that the wheels of the hybrid vehicle is driven or rotated by the kinetic energy produced from electric motor 1.

Furthermore, electric motor 1 has a function of generating electric power, too. Utilizing regenerative braking during deceleration of the vehicle, electric motor 1 generates regenerative electric power which is recovered by inverter 7 to charge up batteries 2A to 2D.

Inverter 7 is connected, through the input side of its built-in rectifying circuit, to a generator 4 which is directly engaged in driving relation with and driven by an internal combustion engine 3. Generator 4 supplies AC electric power to inverter 7. Both internal combustion engine 3 and generator 4 are operated by ECU 8.

DC output of the rectifying circuit or batteries 2A to 2D is converted into AC electric power through a chopper circuit before being supplied to electric motor 1.

Through charge lines 61A to 61D, batteries 2A to 2D are connected to DC/DC converter 6. Each of batteries 2A to 2D has a pair of positive and negative terminals connected to corresponding positive and negative terminals of one of the independent output sources of DC/DC converter 6.

AC output generated from generator 4 is supplied to a rectifier 9 and rectified into AC output which is supplied to DC/DC converter 6.

Batteries 2A to 2D are equipped with dedicated or exclusive battery sensors 5A to 5D, respectively. Namely, each battery sensor 5*i* (i=A to D) is connected between positive and negative terminals of charge line 61*i* (i=A to D) to detect an actual voltage applied between positive and negative terminals of each battery 2*i* (i=A to D). Thus, detected terminal voltage is representing an actual state-of-charge of each battery 2*i* (i=A to D).

The detected terminal voltage, i.e., each output of battery sensor 2*i* (i=A to D), is sent to ECU 8 for use in the later described state-of-charge judgement of respective batteries 2A to 2D.

ECU 8 further inputs various sensor signals, such as an engine speed signal and an accelerator pedal position (or throttle valve opening degree) signal, to send inverter 7 a signal to control the rotational speed of motor 1 in accordance with the detected driving conditions of the vehicle.

At the same time, ECU 8 adjusts the output of internal combustion engine 3 and controls the field coil current of generator 4 to supply electric motor 1 with a required amount of electric power. ECU 8 is connected to DC/DC converter 6 to send a distribution signal which is later described.

Figure 2:
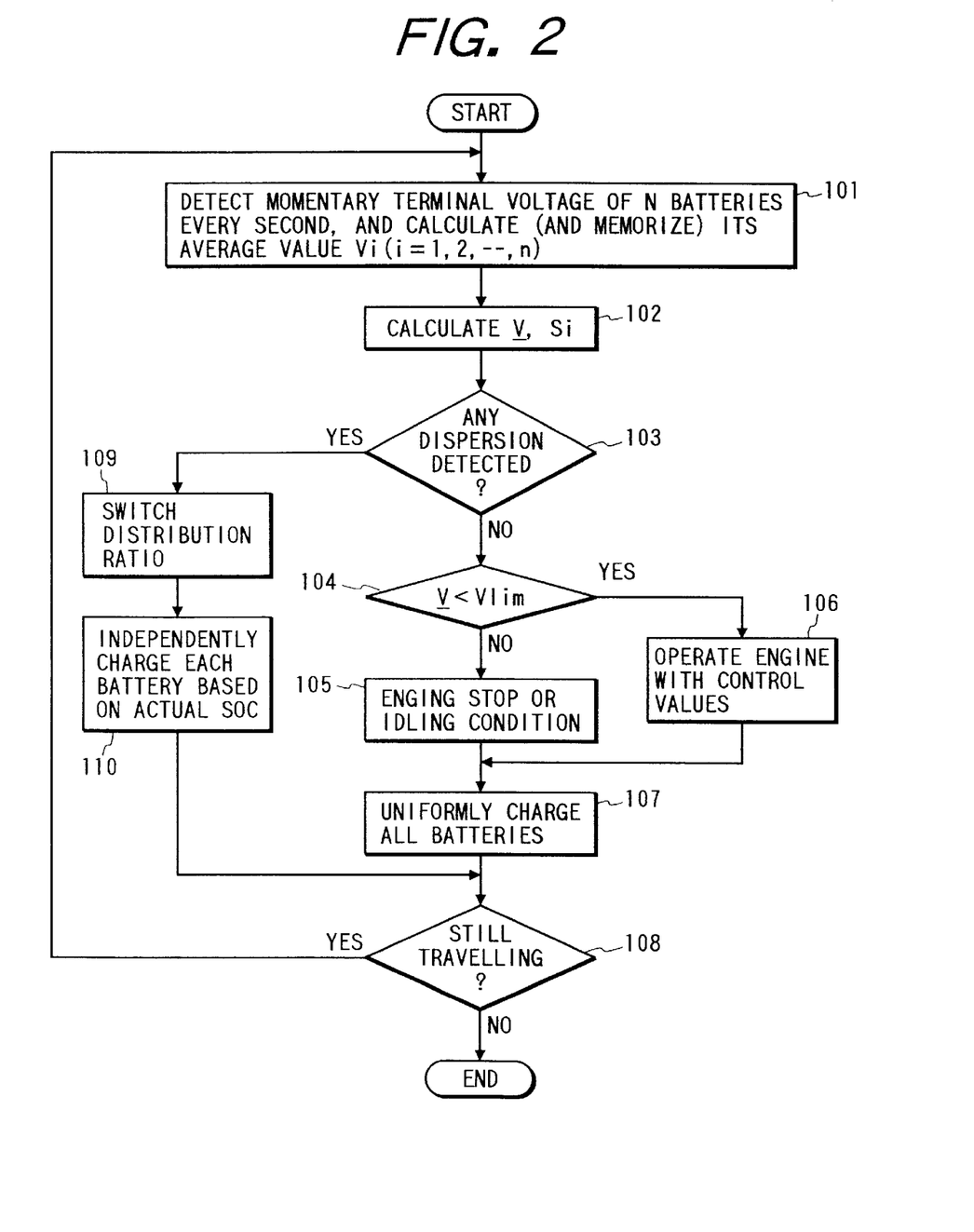
FIG. 2 is a flow chart showing details of a charging operation of the battery charge system for a hybrid vehicle in accordance with the first embodiment of the present invention.

FIG. 2 shows a sequential procedure performed by ECU 8 for charging batteries 2A to 2D in accordance with the first embodiment of the present invention.

In step 101, a momentary terminal voltage vij of each battery 2*i* is sampled or sensed every second by the dedicated battery sensor 5*i*, where i=1,2, - - - ,n. In this first embodiment, n is 4 for a total of four batteries 2A to 2D and their exclusive battery sensors 5A to 5D. Then, an average terminal voltage V*i* of each battery 2*i* (i=1,2, - - - n) is obtained based on the detected momentary terminal voltages vij (j=1,2, - - - 60) during a certain one minute.

$$Vi = \sum_{j=1}^{60} vij/60 \tag{1}$$

The average terminal voltage Vi of each battery 2*i* is then memorized in a memory, such as a RAM (not shown), of ECU 8.

Next, in step 102, an overall terminal voltage $\underline{V}$ of all batteries $2_1, 2_2, - - -, 2_n$ is calculated.

$$\underline{V} = \sum_{i=1}^{n} Vi/n \tag{2}$$

Deviation Si of each battery 2*i* is defined as a difference between each terminal voltage Vi and overall terminal voltage $\underline{V}$ thus obtained.

$$Si = \underline{V} - Vi \tag{3}$$

In step 103, ECU 8 checks the dispersion of state-of-charge with respect to all the associated batteries.

This dispersion judgement is performed by checking whether or not each deviation Si is within a predetermined allowable zone (e.g., 0.5 V).

$$-0.5 \text{ V} \leq Si \leq +0.5 \text{ V} \tag{4}$$

If each deviation Si is within the above-defined allowable zone, ECU 8 judges that there is found no substantial dispersion of the state-of-charge with respect to all of batteries 2*i* (i=1,2, - - - n), and then proceeds to the next step 104.

In step 104, ECU 8 further makes a judgement as to whether the overall terminal voltage $\underline{V}$ is smaller than a predetermined upper limit Vlim.

$$\underline{V} < \text{Vlim} \tag{5}$$

If the overall terminal voltage $\underline{V}$ is not smaller than the predetermined upper limit Vlim, ECU 8 judges that there is a tendency of surplus in the state-of-charge of each battery. Hence, in step 105, ECU 8 stops internal combustion engine 3 or reduces the engine speed to an idling level.

If electric power still remains after performing step 105, this residual electric power is used to uniformly charge the batteries 2*i* (i=1,2, - - - n, i.e., 2A to 2D) in step 107. Thereafter, ECU 8 makes a judgement in step 108 as to whether the vehicle is still driven or travelling.

If the overall terminal voltage $\underline{V}$ is smaller than the predetermined upper limit Vlim in step 104, ECU 8 determines a chargeable amount in accordance with the average state-of-charge represented by $\underline{V}$, and then ECU 8 controls engine 3 to cause generator 4 to generate a required amount of electric power in accordance with the chargeable amount determined (Step 106).

Kinetic energy of engine 3 is converted into electric power through generator 4, a part of which is used in the motor 3 to drive or rotate the wheels 33A and 33B of the vehicle and the remainder of which is used to uniformly charge up the batteries 2A to 2D (Step 107).

Figure 3A:
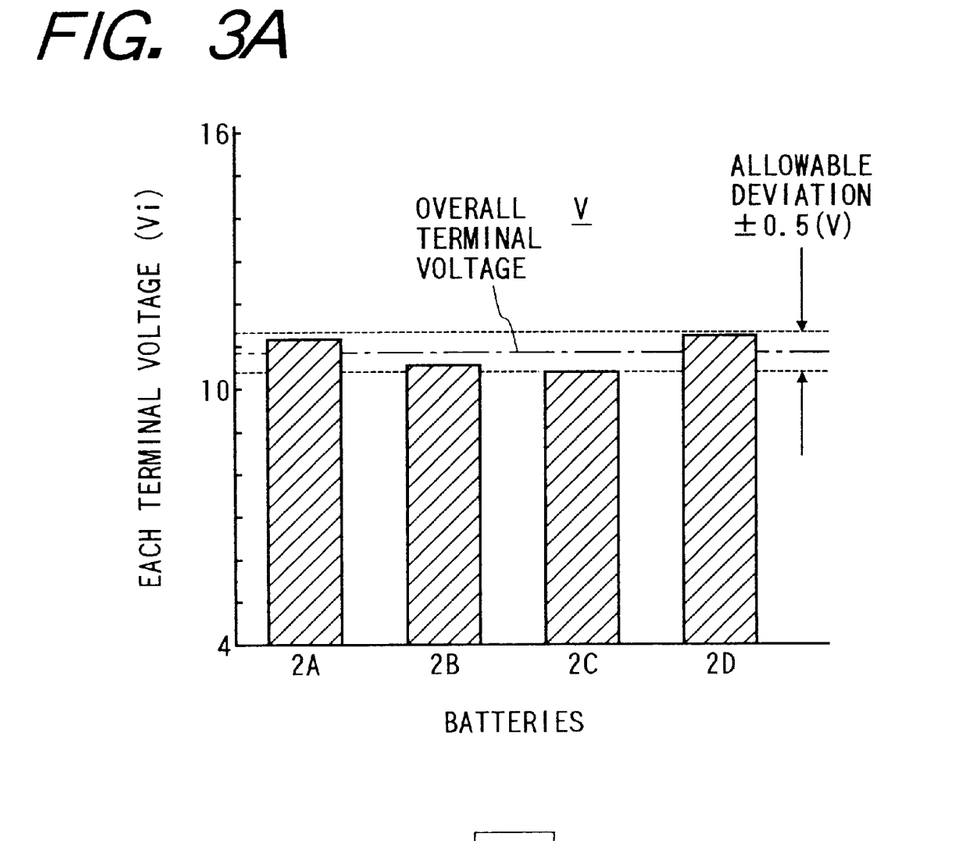
FIGS. 3A and 3B are graphs illustrating small dispersion of the state-of-charge and a uniform distribution ratio in accordance with the present invention.
Figure 3B:
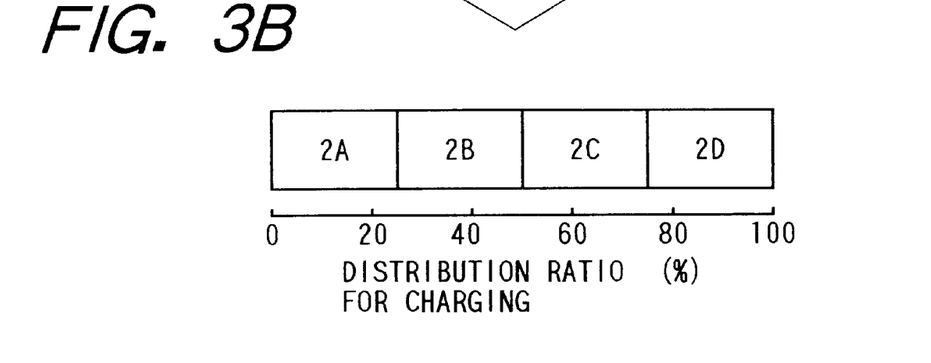

FIGS. 3A and 3B cooperatively show the state-of-charge of each battery in relation to the distribution ratio of to-be-charged amount allocated to each battery.

As shown in FIG. 3A, each deviation of average terminal voltage Vi from the overall terminal voltage $\underline{V}$ is within the predetermined allowable zone (±0.5 V). As shown in FIG. 3B, the distribution ratio of to-be-charged amount is equally (i.e., 25%) divided or allocated to each battery. Thus, all batteries 2A–2D are uniformly charged by the same amount in step 107.

ECU 8 shuts off the power supply line connecting generator 4 to inverter 7, while allowing the generated electric power to go from generator 4 to DC/DC converter 6 through rectifier 9. ECU 8 sends the distribution signal to DC/DC converter 6 so that batteries 2A to 2D are uniformly charged through charge lines 61A to 61D in accordance with the designated distribution ratio (0.25:0.25:0.25:0.25).

On the other hand, ECU 8 changes or switches the distribution ratio when any dispersion of state-of-charge is found in step 103.

Figure 4A:
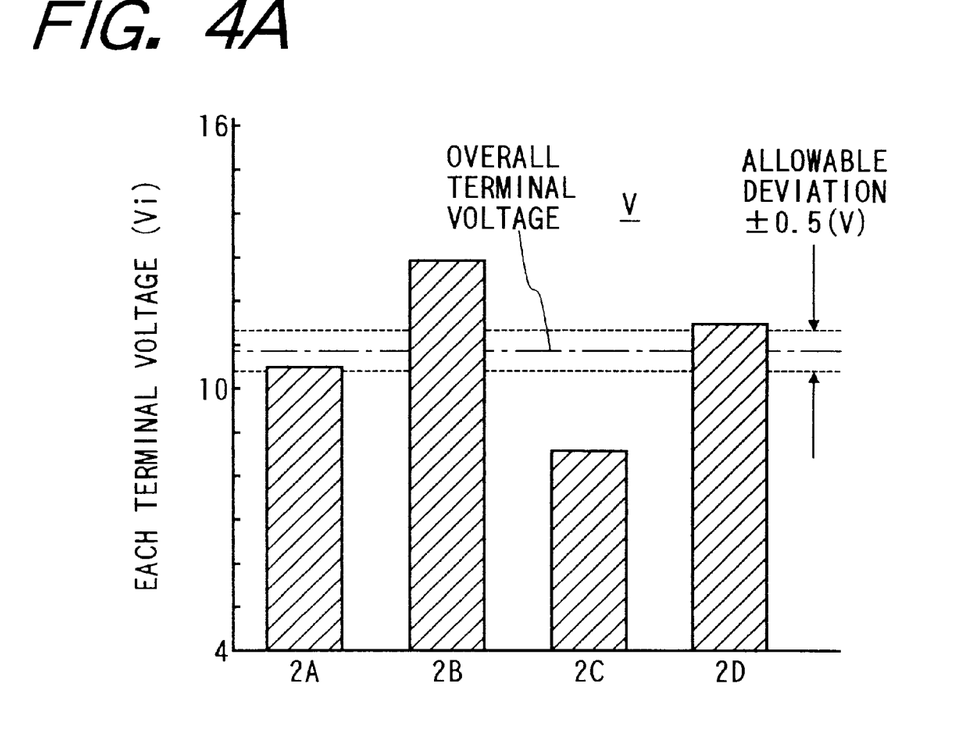
FIGS. 4A and 4B are graphs illustrating large dispersion of the state-of-charge and a switched distribution ratio in accordance with the present invention.
Figure 4B:
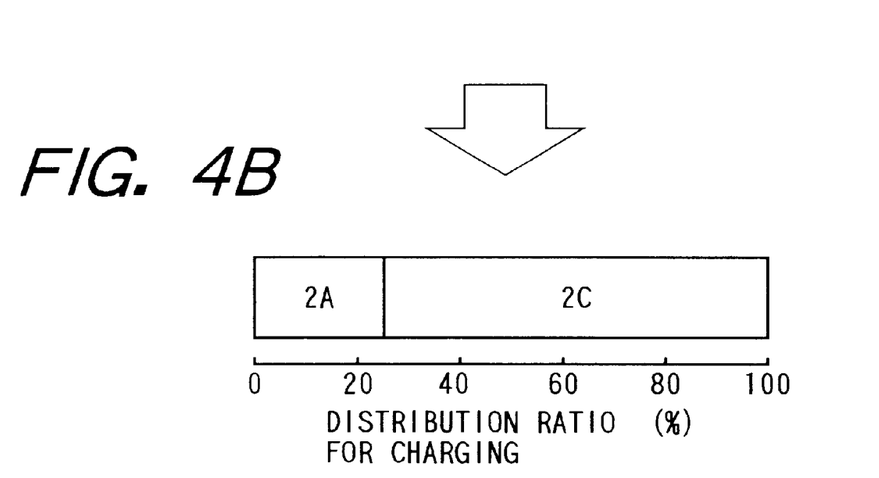

FIGS. 4A and 4B cooperatively show the state-of-charge of each battery in relation to the distribution ratio of to-be-charged amount allocated to each battery.

As shown in FIG. 4A, two of four batteries have an average terminal voltage largely deviated from overall terminal voltage $\underline{V}$ by exceeding the predetermined upper and lower limits (±0.5 V). Among them, battery 2C has a serious shortage of electric power, while battery 2B is sufficient in its state-of-charge.

As shown in FIG. 4B, the distribution ratio of to-be-charged amount is largest in the battery 2C and second largest in the battery 2A in accordance with the actual state-of-charge of respective batteries 2A to 2D. Namely, in step 109, the distribution ratio is set to be 25%:0%:75%:0% with respect to batteries 2A to 2D.

In step 110, ECU 8 independently controls the charging operation of batteries 2A to 2D with reference to the distribution ratio designated in step 109. More specifically, considering the shortage of electric power (i.e., actual state-of-charge) in each battery, ECU 8 control DC/DC converter 6 in such a manner that the most seriously-conditioned battery 2C is charged by a largest amount (75%) and the next most serious battery 2A is charged by a smaller or next-largest amount (25%), while the still-sufficiently-charged batteries 2B and 2D are not charged in this case.

In other words, batteries 2A–2D receive the remainder of electric power in accordance with the designated distribution ratio when the surplus electric power is available from generator 4 even after a required amount of electric power is used from generator 4 to drive or rotate wheels 33A and 33B.

ECU 8 shuts off the power supply line connecting generator 4 to inverter 7 while allowing the surplus electric power to go from generator 4 to DC/DC converter 6 through rectifier 9. ECU 8 sends the distribution signal to DC/DC converter 6 so that only batteries 2A and 2C are charged through charge lines 61A and 61C in accordance with the designated distribution ratio (0.25:0.75).

On the other hand, batteries 2B and 2D, which have an average terminal voltage not smaller than the overall terminal voltage $\underline{V}$, are left without being charged. Thus, it becomes possible to correct the dispersion of state-of-charge among batteries 2A to 2D, while preventing the still-sufficiently-charged batteries 2B and 2D from being excessively charged.

In this manner, the first embodiment detects the state-of-charge of each battery to independently control the state-of-charge of each battery. Hence, a concerned battery will be independently charged when it is suffering from the shortage of electric power, while it will be left without being charged when it maintains a sufficient state-of-charge.

As apparent from the foregoing description, the first embodiment of the present invention provides a battery charge system applicable to a series hybrid vehicle comprising an electric drive means (1) for rotating wheels (33A, 33B) of the hybrid vehicle; a plurality of batteries (2A–2D) supplying electric power to the electric drive means (1); a generator means (4) driven by an internal combustion engine (3) for generating electric power to charge the plural batteries (2A–2D); a state-of-charge detecting means (5A–5D) detecting the state-of-charge of each of plural batteries (2A–2D); and a charge control means (6, 8) independently charging each of the plural batteries based on the state-of-charge detected by the state-of-charge detecting means (5A–5D), thereby independently charging each battery in accordance with an actual state-of-charge of each battery.

More specifically, the charge control means (6, 8) distributes electric power in accordance with the actual state-of-charge of respective batteries (2A–2D) when the electric power is available as a remainder from the generator means (4) even after a required amount of electric power is used from the generator means (4) to rotate the wheels (33A and 33B). The state-of-charge detecting means (5A–5D) detects the state-of-charge by sensing an actual terminal voltage (Vi) of each of the plural batteries (2A–2D). And, the state-of-charge detecting means (5A–5D) obtains an average of the state-of-charge among the plural batteries as a reference value ($\underline{V}$), and the charge control means (6, 8) charges a concerned battery only when the concerned battery has a state-of-charge (Vi) lower than the reference value ($\underline{V}$)

Furthermore, the charge control means (6, 8) distributes electric power in accordance with the shortage of charge in respective batteries (2A–2D) when the electric power is available as a remainder from the generator means (4) even after a required amount of electric power is used from the generator (4) to rotate the wheels (33A, 33B).

Moreover, the first embodiment provides a novel and useful method of precisely controlling the state-of-charge of each of plural batteries using above-described means.

Figure 5:
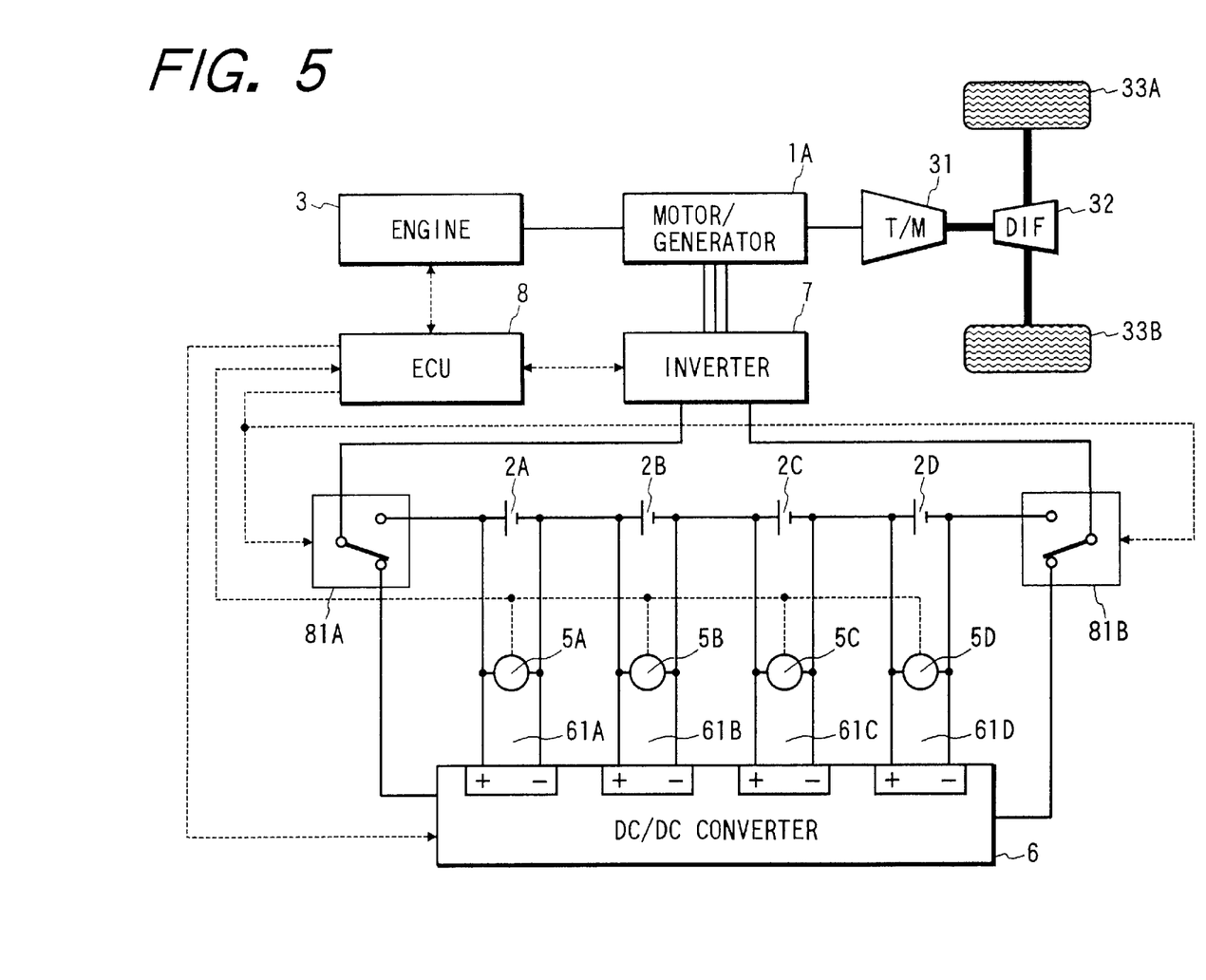
FIG. 5 is a block diagram showing an overall arrangement of a battery charge system for a hybrid vehicle in accordance with a second embodiment of the present invention.

FIG. 5 is an overall arrangement of a battery charge control system incorporated in a parallel hybrid vehicle (PHV) in accordance with a second embodiment of the present invention.

An internal combustion engine 3, serving as a main driving power source for the hybrid vehicle, is connected to a rotational shaft of a motor/generator 1A serving as a sub driving power source for the hybrid vehicle. The motor/generator 1A has an output shaft connected in a driving linkage relation to vehicle wheels 33A and 33B through a conventional driving mechanism including a transmission 31 and a differential mechanism 32. Namely, a rotational driving force of internal combustion engine 3 and/or motor/generator 1A is once speed changed by transmission 31 and then transmitted to vehicle wheels 33A and 33B via differential mechanism 32. Thus, wheels 33A and 33B are driven or rotated by kinetic energy obtained from both internal combustion engine 3 and motor/generator 1A.

The motor/generator 1A has both functions of an electric motor and a generator. More specifically, when the motor/generator 1A acts as an electric motor, it generates an output torque in accordance with an exciting current variably controlled based on an exciting current control signal. On the other hand, when the motor/generator 1A acts as a generator, it generates a regenerative torque in response to a rotational force received from its rotational shaft.

The motor/generator 1A is electrically connected to a plurality of batteries 2A to 2D through an inverter 7. The exciting current of motor/generator 1A is supplied from batteries 2A to 2D through inverter 7, while the exciting current control signal is supplies from ECU 8.

Batteries 2A to 2D are connected in series with each other. A changeover switch 81A is interposed between inverter 7 and one end of serially connected batteries 2A to 2D. Another changeover switch 81B is interposed between inverter 7 and the other end of serially connected batteries 2A to 2D.

Each of changeover switches 81A and 81B has one terminal connected to batteries 2A to 2D and the other terminal connected to DC/DC converter 6. ECU 8 sends a changeover signal to each of changeover switches 81A and 81B so as to selectively connect inverter 7 to batteries 2A–2D or to DC/DC converter 6.

Through charge lines 61A to 61D, batteries 2A to 2D are connected to DC/DC converter 6. Each of batteries 2A to 2D has a pair of positive and negative terminals connected to corresponding positive and negative terminals of one of independent output sources of DC/DC converter 6.

When changeover switches 81A and 81B are switched to the DC/DC converter 6, motor/generator 1A can supply electric power through inverter 7 to DC/DC converter 6. DC/DC converter 6 has a function of distributing the electric power supplied to batteries 2A–2D in accordance with a predetermined distribution ratio which is designated from ECU 8. Namely, each of plural batteries 2A to 2D can be independently charged under the control of ECU 8 through DC/DC converter 6.

The distribution ratio among plural batteries 2A to 2D is determined based on the state-of-charge of these batteries 2A–2D.

Batteries 2A to 2D are equipped with battery sensors 5A to 5D, respectively. Namely, each battery sensor $5i$ (i=A to D) is connected between positive and negative terminals of charge line $61i$ (i=A to D) to detect an actual voltage applied between positive and negative terminals of each battery $2i$ (i=A to D). Thus, detected terminal voltage is representing an actual state-of-charge of each battery $2i$ (i=A to D).

The detected terminal voltage, i.e., each output of battery sensor $2i$ (i=A to D), is sent to ECU 8 for use in the later described state-of-charge judgement of respective batteries 2A to 2D.

ECU 8 further inputs various sensor signals for detecting engine speed, vehicle speed, accelerator pedal position (or throttle valve opening degree), brake pedal position, etc., although sensors are not shown in FIG. 5. Based on these sensor signals, ECU 8 controls engine 3, inverter 7, DC/DC converter 6, and changeover switches 81A and 81B.

Figure 6A:
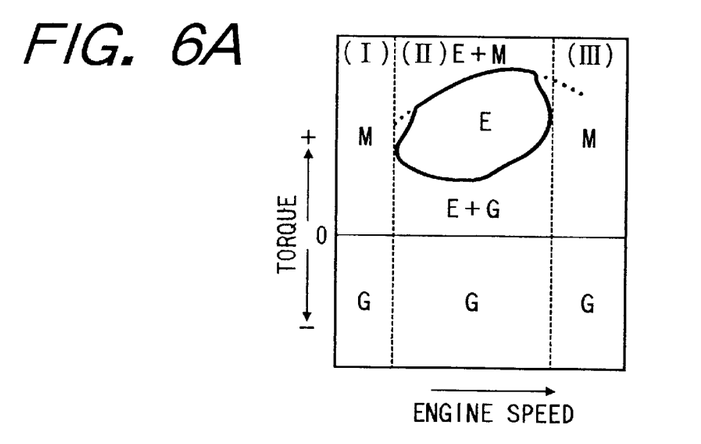
FIGS. 6A, 6B and 6C are views showing operating patterns of an internal combustion engine and a motor/generator in accordance with the second embodiment of the present invention.

FIG. 6A shows a hybrid vehicle driving pattern (hereinafter referred to as a driving pattern) applied when motor/generator 1A is in an ordinary operating condition. In FIG. 6A, a region corresponding to "positive torque" represents a normal travelling condition where a significant driving torque is required for driving or rotating wheels. The remaining region corresponding to "negative torque" represents a descent travelling condition where a regenerative braking is available.

In view of driving efficiency, the internal combustion engine 3 is normally driven at a WOT (wide open throttle) condition, wherein the throttle (not shown) is maintained at a wholly opened degree and the output of internal combustion engine 3 varies in direct proportion to the amount of fuel injected from an fuel injection valve (not shown).

More specifically, the engine is usually driven in a region II of FIG. 6A to improve fuel economy. When the vehicle is cruising, engine 3 is chiefly used to generate a required torque as driving source of the vehicle, while motor/generator 1A is supplementarily used only when it is required (refer to a region denoted by "E"). When the vehicle is accelerated, both engine 3 and motor/generator 1A are fully used as driving source of the vehicle (refer to a region denoted by "E+M").

Engine 3 has poor efficiency in specific regions, such as an engine start-up condition or a high-speed travelling condition (refer to regions I and III in FIG. 6A). In these regions, motor/generator 1A is solely driven to generate a required torque, while engine 3 is stopped (as denoted by "M" in FIG. 6A).

When the vehicle is driven in the region "E+G", the remainder of electric power is used to charge batteries 2A to 2D when the surplus of electric power is available from motor/generator 1A even after a required amount of electric power is used from motor/generator 1A to drive or rotate wheels 33A and 33B. When the vehicle is driven in the region "G", batteries 2A to 2D are automatically charged by motor/generator 1A utilizing regenerative braking torque available in the deceleration condition.

Furthermore, when the vehicle is driven in the region "E", batteries 2A to 2D are not charged. However, if any one of batteries 2A to 2D is suffering from the shortage of electric power, the driving pattern is flexibly switched to perform the charging operation and, if required, the discharge operation too.

Figure 7:
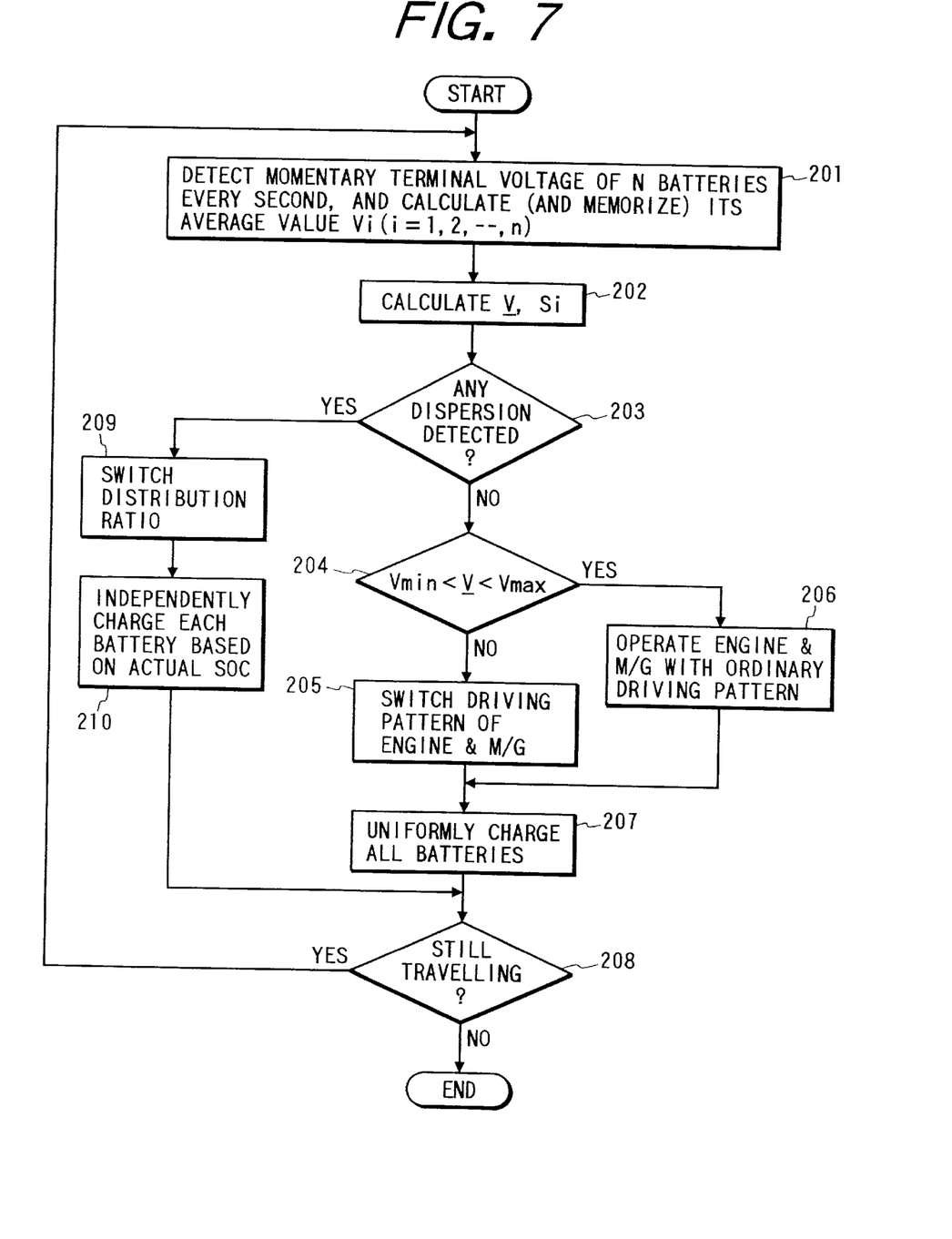
FIG. 7 is a flow chart showing details of a charging operation of the battery charge system for a hybrid vehicle in accordance with the second embodiment of the present invention.

FIG. 7 shows a sequential procedure performed by ECU 8 for charging batteries 2A to 2D as well as switching the driving pattern in accordance with the second embodiment of the present invention.

In step 201, a momentary terminal voltage vij of each battery $2i$ is sampled or sensed every second by the dedicated battery sensor $5i$, where i=1,2, - - - ,n. In this second embodiment, n is 4 for a total of four batteries 2A to 2D and their exclusive battery sensors 5A to 5D. Then, an average terminal voltage Vi of each battery $2i$ (i=1,2, - - - n) is obtained based on the detected momentary terminal voltage vij (j=1,2, - - - 60) during a certain one minute.

$$Vi = \sum_{j=1}^{60} vij/60 \qquad (1')$$

The average terminal voltage Vi of each battery $2i$ is then memorized in a memory, such as a RAM (not shown), of ECU 8.

Next, in step 202, an overall terminal voltage $\underline{V}$ of all batteries $2^1, 2_2, \text{- - -}, 2^n$ is calculated.

$$\underline{V} = \sum_{i=1}^{n} Vi/n \qquad (2')$$

Deviation Si of each battery $2i$ is defined as a difference between each terminal voltage Vi and overall terminal voltage $\underline{V}$ thus obtained.

$$Si = \underline{V} - Vi \qquad (3')$$

In step 203, ECU 8 checks the dispersion of state-of-charge with respect to all the associated batteries.

This dispersion judgement is performed by checking whether or not each deviation Si is within a predetermined allowable zone (e.g. ±0.5 V).

$$-0.5 \text{ V} \leq Si \leq +0.5 \text{ V} \qquad (4')$$

If each deviation Si is within the above-defined allowable zone, ECU 8 judges that there is found no substantial dispersion of the state-of-charge with respect to all of batteries $2i$ (i=1,2, - - - n), and then proceeds to the next step 204.

In step 204, ECU 8 further makes a judgement as to whether the overall terminal voltage $\underline{V}$ is smaller than a predetermined upper limit Vmax and larger than a predetermined lower limit Vmin.

$$Vmin < \underline{V} < Vmax \qquad (5')$$

If the overall terminal voltage $\underline{V}$ is not smaller than the predetermined upper limit Vmax or not larger than the predetermined lower limit Vmin, ECU 8 proceeds to step 205.

When the overall terminal voltage $\underline{V}$ is not smaller than the predetermined upper limit Vmax ($\underline{V} \geq$ Vmax), ECU 8 judges that there is a tendency of surplus in the state-of-charge of all batteries 2A to 2D. Hence, ECU 8 changes the driving pattern from FIG. 6A to FIG. 6B.

Figure 6B:
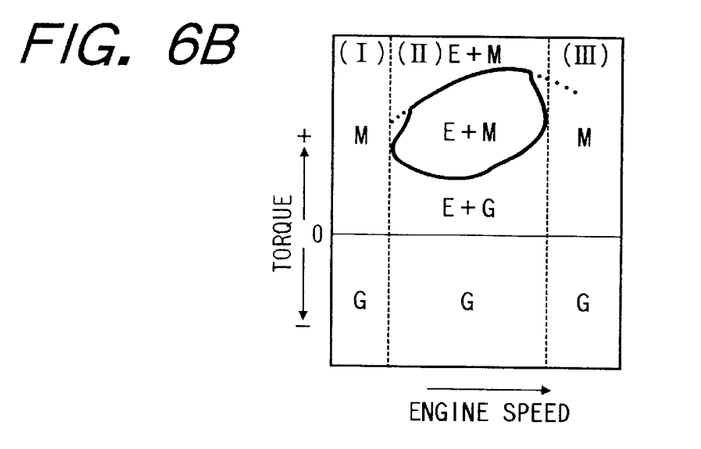

More specifically, ECU 8 switches the function of motor/generator 1A to a motor mode (refer to a region denoted by "E+M" in FIG. 6B). In this driving region, ECU 8 calculates a demanded power necessary for rotating wheels 33A and 33B at a requested speed based on vehicle travelling conditions detected by various sensors, such as an accelerator pedal position sensor.

Then, ECU 8 calculates the shortage of power of engine 3 by comparing the actual output of engine 3 and the demanded power calculated. If there is found the shortage of power of the engine, ECU 8 sends inverter 7 an exciting current control signal based on the calculated amount of shortage of power.

In response to the exciting current control signal, inverter 7 supplies electric power to motor 1A from batteries 2A–2D, thereby compensating for the lack of power of engine 3. Using motor/generator 1A as a supplemental driving source in this manner will surely reduce the charge amount in each battery, resulting in elimination of the excessive charge condition.

On the other hand, when the overall terminal voltage $\underline{V}$ is not larger than the predetermined lower limit Vmin ($\underline{V}$<Vmin), ECU 8 judges that there is a tendency of shortage in the state-of-charge of all batteries 2A to 2D. Hence, ECU 8 changes the driving pattern from FIG. 6A to FIG. 6C.

Figure 6C:
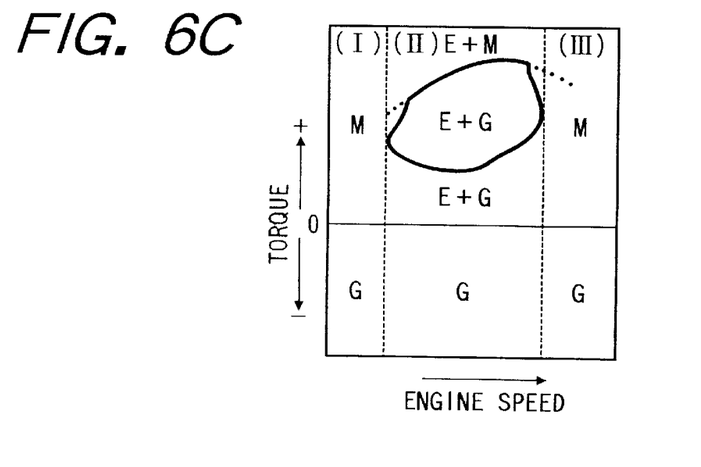

More specifically, ECU 8 switches the function of motor/generator 1A to a generator mode (refer to a region denoted by "E+G" in FIG. 6C). In this driving region, ECU 8 controls engine 3 to increase its rotational speed, so that generator 1A can produce electric power sufficient to charge batteries 2A–2D (Step 205).

A part of kinetic energy produced from engine 3 is used for driving or rotating wheels 33A and 33B, and the remainder of kinetic energy of engine 3 is converted into electric power through generator 1A to uniformly charge up the batteries 2A to 2D (Step 207).

As shown in FIG. 3A, when the deviation of average terminal voltage Vi from the overall terminal voltage $\underline{V}$ is within the predetermined allowable zone (±0.5 V), the distribution ratio of the to-be-charged amount is equally divided (i.e., 25%) to each battery. Thus, all batteries 2A–2D are charged by the same amount in step 207.

ECU 8 switches changeover switches 81A and 81B to connect batteries 2A–2D to inverter 7, so that batteries 2A–2D are equally charged by a common current supplied from generator 1A through inverter 7. The distribution ratio among batteries 2A to 2D is 0.25:0.25:0.25:0.25 in this case.

Thereafter, ECU 8 makes a judgement in step 208 as to whether the vehicle is still driven or travelling. For example, a parking brake is applied, this routine will end. Otherwise, i.e., when the judgement result is YES in step 208, this control routine returns to step 201 to repeat the same procedure.

When the overall terminal voltage $\underline{V}$ is larger than the predetermined lower limit Vmin and smaller than the predetermined upper limit Vmax (Vmin<$\underline{V}$<Vmax), ECU 8 controls engine 1 using the ordinary driving pattern shown in FIG. 6A (Step 206), and then proceeds to step 207.

Meanwhile, when any dispersion of state-of-charge is found in step 203, ECU 8 proceeds to step 209 to change or switch the distribution ratio.

As shown in FIG. 4A, if the average terminal voltage of any battery (2C) is so largely deviated from overall terminal voltage $\underline{V}$ that it falls below the predetermined lower limits (–0.5 V), the distribution ratio is intentionally changed to mainly charge up the seriously-conditioned battery (2C).

As shown in FIG. 4B, the distribution ratio of the to-be-charged amount is largest in the battery 2C and second largest in the battery 2A in accordance with the actual state-of-charge of respective batteries 2A to 2D shown in FIG. 4A. Namely, in step 209, the distribution ratio is set to 25%:0%:75%:0% with respect to batteries 2A to 2D.

Then, in step 210, ECU 8 independently controls the charging operation of batteries 2A to 2D with reference to the distribution ratio designated in step 209. More specifically, considering the shortage of electric power (i.e., actual state-of-charge) in each battery, ECU 8 control DC/DC converter 6 in such a manner that the most seriously-conditioned battery 2C is charged by a largest amount (75%) and the next most serious battery 2A is charged by a smaller or next-largest amount (25%), while the still-sufficiently-charged batteries 2B and 2D are not charged in this case.

In other words, batteries 2A–2D receive the remainder of electric power in accordance with the designated distribution ratio when the surplus of electric power is available from generator 1A even after a required amount of electric power is used from generator 1A to drive or rotate wheels 33A and 33B.

In this charging operation, ECU 8 switches changeover switches 81A and 81B to connect inverter 7 to DC/DC converter 6, and then sends the distribution signal to DC/DC converter 6 to distribute electric power to batteries 2A and 2C through charge lines 61A and 61C in accordance with the designated distribution ratio (0.25:0.75).

On the other hand, batteries 2B and 2D, which have an average terminal voltage not smaller than the overall terminal voltage $\underline{V}$, are left without being charged. Thus, it becomes possible to correct the dispersion of state-of-charge among batteries 2A to 2D while preventing the still-sufficiently-charged batteries 2B and 2D from being excessively charged.

In this manner, the second embodiment detects the state-of-charge of each battery to independently control the state-of-charge of each battery. Hence, a concerned battery will be independently charged when it is suffering from the shortage of electric power, while it will be left without being charged when it maintains a sufficient state-of-charge.

Although the second embodiment adopts changeover switches 81A and 81B, it will be possible to omit these switches when DC/DC converter 6 is always used to charge batteries 2A–2D in accordance with the designated distribution ratio even when no substantial dispersion is found in step 203. Namely, in step 207, ECU 8 controls DC/DC converter 6 to charge all batteries 2A–2D in accordance with the uniform distribution ratio 0.25:0.25:0.25:0.25.

In the embodiments of the present invention, the disclosed state-of-charge detecting method can be replaced by any other method equivalent to the detection of an average terminal voltage of each battery. For example, it will be possible to sense the specific gravity of battery fluid.

Furthermore, in the event any substantial dispersion of state-of-charge is found among the batteries, it will be possible to perform the charging operation for eliminating the dispersion only when the vehicle is stopping.

Moreover, it will be desirable to correct reference values, such as Vmin, Vmax, $\underline{V}$, with reference to the largeness of current flowing across the batteries, in view of the fact that battery terminal voltage is varied in response to current flowing across the battery.

As is apparent from the foregoing description, the second embodiment of the present invention provide a battery charge system applicable to a parallel hybrid vehicle: comprising an electric drive means (1A) for rotating wheels (33A, 33B) of the hybrid vehicle; a plurality of batteries (2A–2D) supplying electric power to the electric drive means (1A); a generator means (1A) driven by an internal combustion engine (3) for generating electric power to charge the plural batteries (2A–2D); a state-of-charge detecting means (5A–5D) detecting the state-of-charge of each of plural batteries (2A–2D); and a charge control means (6, 8) independently charging each of the plural batteries based on the state-of-charge detected by the state-of-charge detecting means (5A–5D), thereby independently charging each battery in accordance with an actual state-of- charge of each battery.

More specifically, the charge control means (6, 8) distributes electric power in accordance with the actual state-of-charge of respective batteries (2A–2D) when the electric power is available as a remainder from the generator means (1A) even after a required amount of electric power is used from the generator means (1A) to rotate the wheels (33A and 33B). The state-of-charge detecting means (5A–5D) detects the state-of-charge by sensing an actual terminal voltage (Vi) of each of the plural batteries (2A–2D). And, the state-of-charge detecting means (5A–5D) obtains an average of the state-of-charge among the plural batteries as a reference value ($\underline{V}$), and the charge control means (6, 8) charges a concerned battery only when the concerned battery has a state-of-charge (Vi) lower than the reference value ($\underline{V}$).

Furthermore, the charge control means (6, 8) distributes electric power in accordance with the shortage of charge in respective batteries (2A–2D) when the electric power is available as a remainder from the generator means (1A) even after a required amount of electric power is used from the generator (1A) to rotate the wheels (33A, 33B).

Furthermore, a switching means (81A, 81B) is interposed in a path connecting the generator means (1A) and the batteries (2A–2D) for switching a first charge circuit and a second charge circuit. The first charge circuit connects the generator means (1A) to the batteries (2A–2D) through the charge control means (6), while the second charge circuit connects the generator means (1A) to the batteries (2A–2D) directly. And, the switching means (81A, 81B) selects the second circuit when the plural batteries (2A–2D) have no substantial deviation in their state-of-charge values.

Moreover, the second embodiment provides a novel and useful method of precisely controlling the state-of-charge of each of plural batteries using the above-described means.

As this invention may-be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A battery charge apparatus for a hybrid vehicle, said apparatus comprising:
   electric drive means for rotating wheels of the hybrid vehicle;
   a plurality of batteries serially connected to one another to supply electric power to said electric drive means;
   generator means driven by an internal combustion engine for generating electric power to charge said serially-connected batteries;
   state-of-charge detecting means for detecting a state-of-charge of each of said serially-connected batteries; and
   charge control means for independently charging each of said serially-connected batteries when a dispersion of the state-of-charge of each battery detected by said state-of-charge detecting means is larger than a predetermined value, thereby charging each battery in accordance with an actual state-of-charge of that battery and for uniformly charging all of said serially-connected batteries when said dispersion of the state-of-charge of each battery is smaller than said predetermined value .

2. The battery charge apparatus defined by claim 1, wherein said hybrid vehicle is a series hybrid vehicle having wheels solely driven by kinetic energy obtained from said electric drive means.

3. The battery charge apparatus defined by claim 2, wherein said charge control means is for distributing electric power in accordance with the actual state-of-charge of respective batteries when said electric power is available as a remainder from said generator means even after a required amount of electric power is used from said generator means to rotate said wheels.

4. The battery charge apparatus defined by claim 3, wherein said state-of-charge detecting means is for detecting said state-of-charge by sensing an actual terminal voltage of each of said plural batteries.

5. The battery charge apparatus defined by claim 2, wherein said state-of-charge detecting means is for detecting said state-of-charge by sensing an actual terminal voltage of each of said plural batteries.

6. The battery charge apparatus defined by claim 2, wherein:
   said state-of-charge detecting means is for obtaining an average of said state-of-charge among said plural batteries as a reference value; and
   said charge control means is for charging a concerned battery only when said concerned battery has a state-of-charge lower than said reference value.

7. The battery charge apparatus defined by claim 6, wherein said charge control means is for distributing electric power in accordance with the shortage of charge in respective batteries when said electric power is available as a remainder from said generator means even after a required amount of electric power is used from said generator means to rotate said wheels.

8. The battery charge apparatus defined by claim 7, wherein said state-of-charge detecting means is for detecting an actual terminal voltage of each battery and for calculating an average of said actual terminal voltage among said plural batteries as said reference value.

9. The battery charge apparatus defined by claim 6, wherein said state-of-charge detecting means is for detecting an actual terminal voltage of each battery and for calculating an average of said actual terminal voltage among said plural batteries as said reference value.

10. The battery charge apparatus defined by claim 2, wherein each battery is independently connected to said charge control means through exclusive charge lines.

11. The battery charge apparatus defined by claim 1, wherein said hybrid vehicle is a parallel hybrid vehicle having wheels driven by kinetic energy obtained from both said electric drive means and said internal combustion engine.

12. The battery charge apparatus defined by claim 11, wherein said charge control means distributes electric power in accordance with the actual state-of-charge of respective batteries when said electric power is available as a remainder from said generator even after a required amount of electric power is used from said generator to rotate said wheels.

13. The battery charge apparatus defined by claim 12, wherein said state-of-charge detecting means is for detecting said state-of-charge by sensing an actual terminal voltage of each of said plural batteries.

14. The battery charge apparatus defined by claim 11, wherein said state-of-charge detecting means is for detecting said state-of-charge by sensing an actual terminal voltage of each of said plural batteries.

15. The battery charge apparatus defined by claim 11, wherein said state-of-charge detecting means is for obtaining an average of said state-of-charge among said plural batteries as a reference value, and said charge control means is for charging a concerned battery only when said concerned battery has a state-of-charge lower than said reference value.

16. The battery charge apparatus defined by claim 15, wherein said charge control means distributes electric power in accordance with the shortage of charge in respective batteries when said electric power is available as a remainder from said generator even after a required amount of electric power is used from said generator to rotate said wheels.

17. The battery charge apparatus defined by claim 16, wherein said state-of-charge detecting means is for detecting an actual terminal voltage of each battery and for calculating an average of actual terminal voltages among said plural batteries as said reference value.

18. The battery charge apparatus defined by claim 15, wherein said state-of-charge detecting means is for detecting an actual terminal voltage of each battery and for calculating an average of actual terminal voltages among said plural batteries as said reference value.

19. The battery charge apparatus defined by claim 11, wherein each battery is independently connected to said charge control means through exclusive charge lines.

20. The battery charge apparatus defined by claim 11, further comprising a switch interposed in a path connecting said generator and said batteries for switching a first charge circuit and a second charge circuit, said first charge circuit connecting said generator to said batteries through said charge control means while said second charge circuit connecting said generator to said batteries directly.

21. The battery charge apparatus defined by claim 20, wherein said switch selects said second circuit when said plural batteries have no substantial deviation in their state-of-charge values.

22. A battery charge apparatus for a hybrid vehicle, said apparatus comprising:

electric drive means for rotating wheels of the hybrid vehicle;

a plurality of batteries serially connected to one another to supply electric power to said electric drive means;

a generator means driven by an internal combustion engine for generating electric power to charge said serially-connected batteries;

state-of-charge detecting means for detecting a state-of-charge of each of said serially-connected batteries;

charge control means for independently charging each of said serially-connected batteries when a dispersion of the state-of-charge detected by said state-of charge detecting means is larger than a predetermined value and for uniformly charging all of said serially-connected batteries when said dispersion of the state-of-charge of each battery is smaller than said predetermined value; and distribution ratio change means for changing a distribution ratio according to which electric power is supplied by said charge control means from said generator means to respective batteries to eliminate the dispersion of the states-of-charge of said serially-connected batteries.

23. The battery charge apparatus defined by claim 22 wherein said distribution ratio change means is for changing said distribution ratio only when said dispersion of the state-of-charge detected by said state-of-charge detecting means is larger than a predetermined value.

24. A battery charge method for a hybrid vehicle having a plurality of serially-connected batteries, said method comprising the steps of:

detecting a state-of-charge value of each of said serially-connected batteries;

judging whether a dispersion of a state-of-charge value of each of said serially-connected batteries is within a predetermined allowable zone; and determining a distribution ratio, according to which electric power is supplied from a generator to respective serially-connected batteries for charging said serially-connected batteries, said distribution ratio being set in such a manner that all of said serially-connected batteries are uniformly charged when said dispersion of the state-of-charge value is within said predetermined allowable zone, while some of batteries having low states of charge are independently charged when said dispersion of the state-of-charge value is out of said predetermined allowable zone, thereby eliminating the dispersion of state-of-charge value.

25. The battery charge method defined by claim 24, wherein said state-of-charge values are detected by sensing a momentary terminal voltage of each battery and obtaining an average of sensed momentary terminal voltages.

26. The battery charge method defined by claim 24, wherein said dispersion of state-of-charge value is defined as a deviation of each state-of-charge value from a reference value, said reference value being an average of all of state-of-charge values.

27. The battery charge method defined by claim 24, further comprising a step of charging said batteries in accordance with said distribution ratio, when electric power is available as a remainder from said generator means even after a required amount of electric power is used from said generator means to rotate wheels of the hybrid vehicle.

28. The battery charge apparatus defined by claim 1, wherein said charge control means is for charging a battery in said plurality of batteries independently when that battery lacks charging.

29. The battery charge apparatus defined by claim 28, further comprising:

calculating means for calculating an average of the state-of-charge among said plurality of batteries;

wherein said charge control means is for charging a battery in said plurality of batteries independently when a deviation between a state-of-charge of that battery and said average of the state-of-charge exceeds a predetermined value.

30. The battery charge apparatus defined by claim 28, wherein said charge control means is for controlling a charging amount to each battery independently in accordance with a degree of lack of charging.

31. The battery charge apparatus as defined by claim 8, wherein said charge control means comprises a DC/DC converter for charging said plurality of batteries via a plurality of sets of charge lines connected to corresponding terminals of said plurality of batteries.

32. The battery charge apparatus defined by claim 22, wherein said charge control means is for charging a battery in said plurality of batteries independently when that battery lacks charging.

33. The battery charge apparatus defined by claim 32, further comprising:

calculating means for calculating an average of the state-of-charge among said plurality of batteries;

wherein said charge control means is for charging a battery in said plurality of batteries independently when a deviation between a state-of-charge of that battery and said average of the state-of-charge exceeds a predetermined value.

34. The battery charge apparatus defined by claim 32, wherein said charge control means is for controlling a charging amount to a battery in said plurality of batteries independently in accordance with a lack amount of charging of that battery.

35. The battery charge apparatus defined by claim 32, wherein said charge control means comprises a DC/DC converter for charging said plurality of batteries via a plurality of sets of charge lines connected to corresponding terminals of said plurality of batteries.

36. The battery charge method defined by claim 24, wherein a battery in said plurality of batteries is charged independently when that battery lacks charging.

37. The battery charge method defined by claim 36, further comprising:

calculating an average of the state-of-charge among said plurality of batteries; and charging a battery in said plurality of batteries independently when a deviation between a state-of-charge of that battery and said average of the state-of-charge exceeds a predetermined value.

38. The battery charge method as defined by claim 36, wherein a charging amount to said each battery is controlled independently in accordance with a degree of lack of charging.

39. The battery charge method defined by claim 36, wherein said plurality of batteries are charged by a DC/DC converter via a plurality of sets of charge lines connected to corresponding terminals of said plurality of batteries.

* * * * *